(12) United States Patent
Slagle

(10) Patent No.: US 9,395,216 B2
(45) Date of Patent: Jul. 19, 2016

(54) DISAPPEARING CONTROLLABLE-ARCH SENSOR BOOM OR CRANE

(71) Applicant: The United States of America, as represented by the Secretary of the Army, Washington, DC (US)

(72) Inventor: Glenn B. Slagle, McLean, VA (US)

(73) Assignee: THE UNITED STATES OF AMERICA, AS REPRESENTED BY THE SECRETARY OF THE ARMY, Washington, DC (US)

( * ) Notice: Subject to any disclaimer, the term of this patent is extended or adjusted under 35 U.S.C. 154(b) by 276 days.

(21) Appl. No.: 14/059,703

(22) Filed: Oct. 22, 2013

(65) Prior Publication Data

US 2015/0107378 A1 Apr. 23, 2015

(51) Int. Cl.
*G01D 11/30* (2006.01)
*H01R 43/26* (2006.01)

(52) U.S. Cl.
CPC ............... *G01D 11/30* (2013.01); *H01R 43/26* (2013.01); *Y10T 29/49117* (2015.01)

(58) Field of Classification Search
CPC ... H01B 13/004; G01D 11/30; F16M 13/022; H01R 43/26; H01R 13/502; B66C 23/36; B66C 13/12; Y10T 29/49194
See application file for complete search history.

(56) References Cited

U.S. PATENT DOCUMENTS

| | | | |
|---|---|---|---|
| 3,291,256 A | 12/1966 | Eitel | |
| 3,332,434 A * | 7/1967 | Stahmer | B23Q 1/0009 137/355.17 |
| 4,044,952 A | 8/1977 | Williams et al. | |
| 4,762,240 A | 8/1988 | Thompson | |
| 5,177,516 A | 1/1993 | Fitz et al. | |
| 6,752,541 B1 | 6/2004 | Dykyj | |
| 7,311,452 B2 | 12/2007 | Chapman | |
| 7,682,307 B2 * | 3/2010 | Danitz | A61B 1/0055 600/141 |
| 2006/0252004 A1 | 11/2006 | Donahoo | |

* cited by examiner

*Primary Examiner* — Peter DungBa Vo
*Assistant Examiner* — Jeffrey T Carley
(74) *Attorney, Agent, or Firm* — Richard J. Kim

(57) ABSTRACT

A reel-based curved boom that follows a predetermined arch or trajectory is disclosed. Such a disappearing controllable-arch sensor boom or crane can enable a sensor on the end of the boom to be extended from a vehicle over obstacles such as walls or low buildings. It can also be extended to view the underside of bridges, or of the vehicle itself. It can be used to view targets of interest that are not within the direct field of view of the vehicle or from directly above said vehicle.

4 Claims, 3 Drawing Sheets

DISAPPEARING CONTROLLABLE-ARCH SENSOR BOOM OR CRANE

GOVERNMENT INTEREST

The invention described herein may be manufactured, used, sold, imported, and/or licensed by or for the Government of the United States of America.

FIELD OF THE INVENTION

This invention relates in general to controllable booms or cranes, and more particularly, to self-deploying electronic sensor masts, booms or cranes.

BACKGROUND OF THE INVENTION

Buttoned-up armor vehicles can be vulnerable to potential threats concealed behind walls, around corners, under culverts/bridges, in buildings, or on roofs in the immediate vicinity of a roadway. They can also lack operational capability to inspect the underside of the vehicle for damage or planted explosives (or to inspect other adjacent vehicles). Existing straight-line jointed booms are not sufficiently maneuverable. They are not able to get over/around obstacles to get a sensor or a pickup device in the proper position to look over a wall or into a road-side culvert.

SUMMARY OF THE INVENTION

Various exemplary embodiments of a reel-based curved boom that follows a predetermined arch or trajectory are disclosed. An exemplary boom or crane may be comprised of a cable that is flexible in one direction and rigid in the other direction. It unreels upward from an armored reel mechanism and bends downward in an arch of predetermined radius. Such an embodiment enables a sensor on the end of the boom to be extended from vehicle over obstacles, or to the underside of bridges or of the vehicle itself, to view targets of interest not within the direct field of view. They can also serve to inspect the underside of the vehicle for damage or planted explosives, and/or to inspect other adjacent vehicles.

One exemplary embodiment is a reel-based curved boom that follows a predetermined arch or trajectory, comprising a cable that is flexible for reeling and rigid for unsupported extension; a sensor configured on an end of the cable; and an armored reel mechanism into which the cable reels, and from which the cable is capable of unreeling upward and bend downward in an arch of predetermined radius.

Another exemplary embodiment is a controllable-arch sensor boom or crane based on a deployment mechanism suitable for mounting on a vehicle, comprising a cable having an end capable of extending to form a boom of a predetermined arch or trajectory when unreeled; a sensor configured on or about the end of the boom; and a reel onto which the cable is reeled, wherein unreeling the cable extends the sensor from a vehicle.

Yet, another exemplary embodiment is a method of fabricating a boom or cable based on a series of closely-spaced rigid rectangular blocks for flexible unwinding in a given direction from a winding on a compact reel mechanism to rigidly project out from a vehicle over a controlled large radius arc, the method comprising the steps of configuring a cable based on a series of closely-spaced rigid rectangular blocks; holding together said series of closely-spaced rigid rectangular blocks by connecting or interconnecting said blocks; configuring a sensor, an illuminator, an actuator or other payload on or about an end of the cable, or alternatively, along the cable; and provisioning flat conductors sandwiched between insulated layers on a top surface of the cable for the purpose of connecting power, video and/or data lines to said sensor, illuminator, actuators or other payload.

BRIEF DESCRIPTION OF THE DRAWINGS

Additional advantages and features will become apparent as the subject invention becomes better understood by reference to the following detailed description when considered in conjunction with the accompanying drawings wherein.

DETAILED DESCRIPTION

A reel-based curved boom that follows a predetermined arch or trajectory is disclosed. An exemplary boom or crane may be comprised of a cable that is flexible in one direction and rigid in the other direction. It unreels upward from an armored reel mechanism and bends downward in an arch of predetermined radius.

Such a disappearing controllable-arch boom or crane can enable a sensor on the end of the boom to be extended from a vehicle over obstacles such as walls or low buildings. It can also be extended to view, e.g., the underside of bridges, or of the vehicle itself. It can be used to view targets of interest that are not within the direct field of view of the vehicle or from directly above said vehicle.

Figure 1:
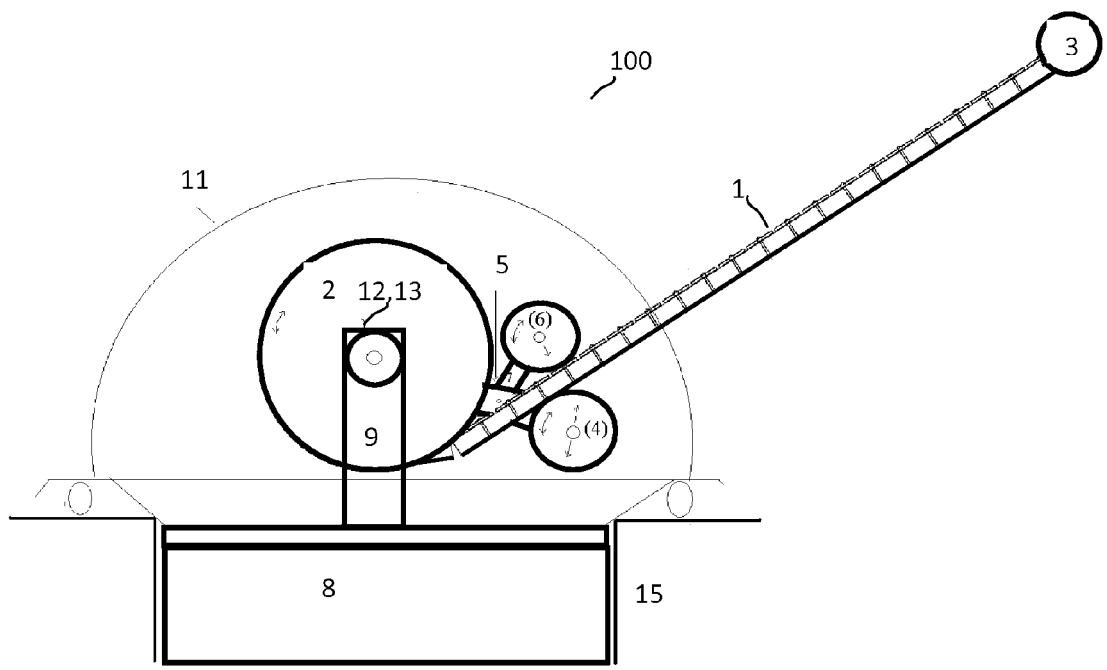
FIG. 1 depicts an exemplary embodiment of a controllable-arch sensor boom or crane based on a deployment mechanism suitable for mounting on a vehicle.

FIG. 1 depicts an exemplary embodiment of a controllable-arch sensor boom or crane 100 based on a deployment mechanism suitable for mounting on a vehicle 300. It utilizes a special support cable 1 on a reel 2 that follows a predetermined arch or trajectory. This enables a sensor 3 on the end of the boom to be extended from a vehicle over obstacles (such as walls or low buildings) (or to the underside of bridges or of the vehicle itself) to view targets of interest not within the direct field of view of the vehicle (or from directly above said vehicle). The cable 1 is flexible in one direction, e.g., for reeling, and rigid in the other direction, e.g., for arched extension against gravity. It unreels upward from an armored reel mechanism 2 and bends downward in an arch of predetermined radius. It utilizes a special rectangular cross section cable or snake 1 that has a large number of blocks hinged as shown in FIG. 1.

The cable 1 is configured as to allow a relatively small bend radius for wrapping on the cable reel 2 as shown (the cable is reeled in and out from the underside of the reel). This cable reel 2 serves both to store the cable under an armor dome 11 and pay out the cable to the desired radius. The geometry of the hinges on the block is such that the cable minimum bend radius in the downward direction is much greater than in the upward direction (due to the compression of the blocks, the radius being controlled by the average inter-block spacing). This allows a motor driven roller (4)/pinch roller (6) assembly on an arm 5 to adjust radial distance of Sensor 3 from the reel 2. Elevation arm 5 can be driven by motor, e.g., 13, to adjust the elevation angle which the cable is launched and control the height of Sensor 3. Reel motor 12 can be used to assist in the rewinding of the cable on the reel and to provide tension to the rollers (4) and (6) during payout to prevent kinking of the cable, as is standard, e.g., in tape recorders. Alternatively, the reel mechanism(s) can be manually actuated. The entire reel and roller assembly can be mounted 9 on a rotation stage 8, which is used to place the cable 1 and sensor 3 at a particular azimuth. The rotation stage 8 can be attached to a suitable vehicular mounting adapter 15, determined by the type of vehicle and desired mounting location thereof.

Figure 2A:
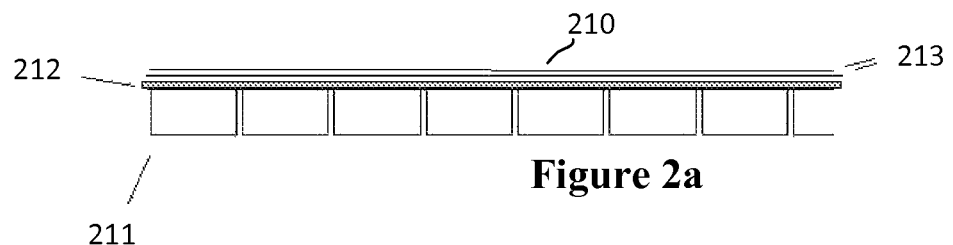
FIG. 2a details one exemplary embodiment of a boom or cable based on a series of closely-spaced rigid rectangular blocks held together by continuous thin flexible tape.

Different exemplary methods of fabricating a boom or cable can result in different exemplary embodiments of a boom or cable that are very flexible in one direction (so as to be wound on a compact reel mechanism) but relatively rigid in the opposite direction (so as to project out from a vehicle more horizontally over a controlled large radius arc). FIG. 2a details one exemplary boom or cable configuration based on a series of closely-spaced rigid rectangular blocks. One exemplary embodiment is a cable 210 based on a series of closely-spaced rigid rectangular blocks 211 held together by continuous thin flexible tape such as stainless steel or other suitable fiber-reinforced tape 212. This tape 212 can be either glued, spot-welded otherwise affixed to the top of each block 211. The tape 212 serves to keep the top edges of adjacent blocks 211 in contact with each other while under tension. Flat conductors 213 can be sandwiched between insulated layers on the top surface of the tape for the purposes of connecting power, video and/or data lines with, e.g., sensors, illuminators or actuators or other payloads, e.g., on the tip of the cable, or alternatively, at other key points along the cable.

Figure 2B:
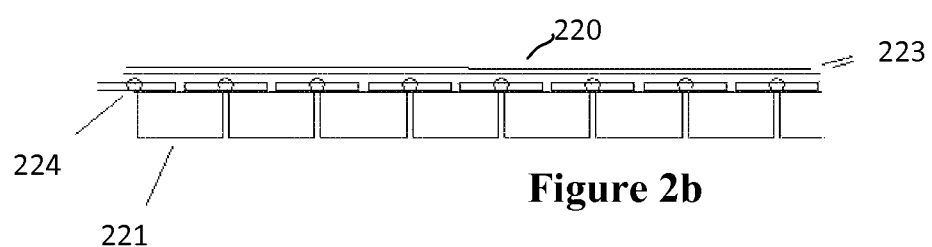
FIG. 2b details another exemplary embodiment of a boom or cable based on blocks interconnected by hinges on the top.

FIG. 2b shows another exemplary embodiment of a boom or cable 220 based on blocks 221 interconnected by hinges 224. Here, the hinges 224 are affixed to connect two adjacent surfaces of the blocks 221 on the top. As before, flat conductors 223 are shown configured along the top.

Figure 2C:
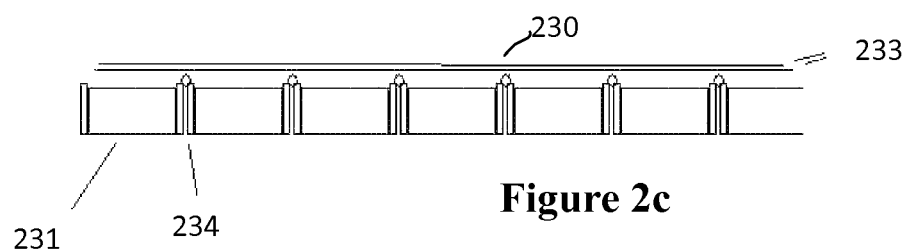
FIG. 2c details yet another exemplary embodiment of a boom or cable based on blocks interconnected by hinges connecting side surfaces.

FIG. 2c shows yet another exemplary embodiment of a boom or cable 230 based on blocks 231 interconnected by hinges 234. Here, the hinges 234 are affixed to connect two side surfaces of the blocks 231 that face each other. As before, flat conductors 233 are shown configured along the top.

Figure 2D:
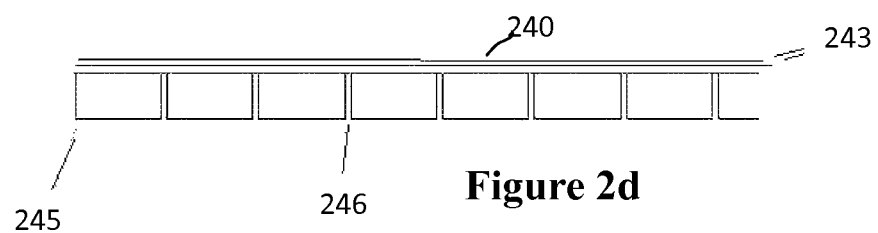
FIG. 2d details another exemplary embodiment of a boom or cable based on rectangular bars of stainless steel or plastic.

FIG. 2d shows an exemplary embodiment of a boom or cable based on a rectangular bar of stainless steel or plastic. For example, a cable 240 can be based on a rectangular bar of stainless steel or plastic (such as for example Polypropylene) 245 with thin slices or precision cuts 246 almost completely through the bar 245. As before, flat conductors 243 are shown configured along the uncut top surface.

In all four exemplary embodiments (FIGS. 2(*a*)-(*d*), the size of the blocks (211, 221, 231, 245) along the length of the cable (210-240) as well as the inter-block spacing can be varied such that the downward bend radius varies at a predetermined rate as the cable is extended out of the reel mechanism. For example, it might be desirable to have a relatively small downward bend radius for the cable nearest the sensor and progressively large bend radius such that the sensor can look into a culvert below the level of vehicle, at a relatively large distance from said vehicle.

Figure 3:
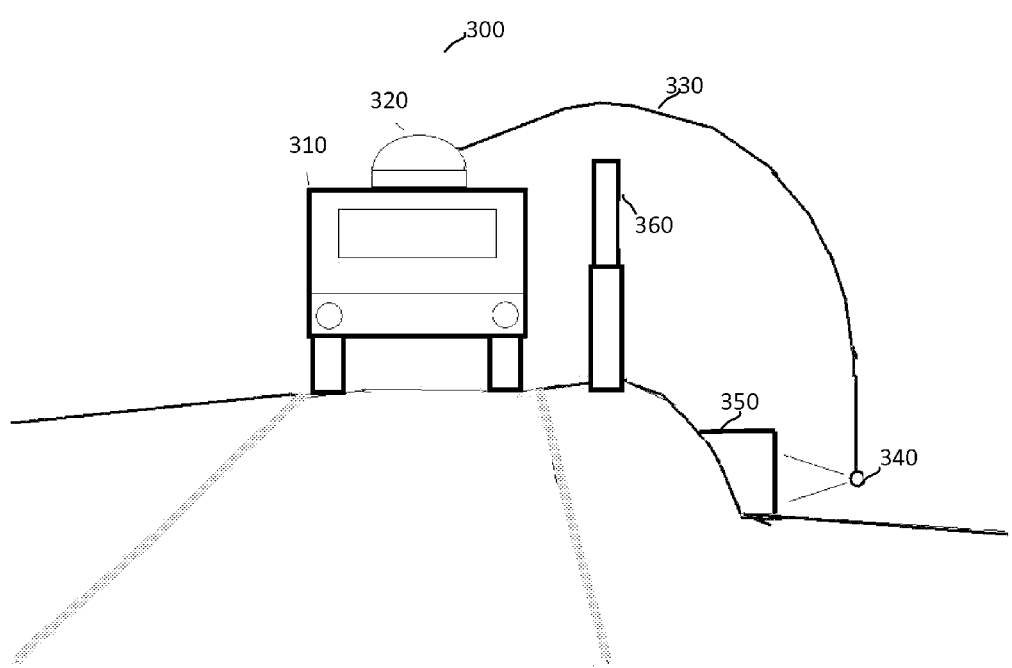
FIG. 3 depicts an exemplary controllable-arch sensor boom or crane installed on a vehicle, said exemplary boom having a sensor on an end of the cable to view, e.g., inside a roadside culvert over an exemplary wall/obstacle.

FIG. 3 shows such an exemplary embodiment 300 of a disappearing controllable-arch sensor boom or crane in operation, with the reel mechanism housed in Turret 320 mounted on a vehicle 310 with cable 330 deployed to enable Sensor 340 to reach over wall/obstacle 360 to look, e.g., into a roadside culvert 350.

The various exemplary methods and apparatus described above could also be applied to a vehicular bridge laying device simply by increasing the horizontal width of the cable (and reel mechanism described) to produce a walkway or road surface sufficiently wide and strong to facilitate foot or vehicular passage. In the place of the sensor, an anchor or footing device can be provisioned to secure the end of the boom (arch bridge) to the opposite bank of the stream or ravine being bridged.

Benefits: The variously described exemplary methods and apparatus can enable improved inspection capabilities, e.g., of the shoulders of elevated roads or culverts and bridges from a transiting vehicle, as well as improved self-inspection of said vehicle or neighboring vehicles on which said road crosses. It can be utilized to see over building rooftops and poke through holes in windows and walls. It can be utilized to see, as well as deliver or extract items, over low hills or walls. It can potentially be stealthier and more flexible/maneuverable than existing ballistic-deployed sensors or micro ground vehicles.

It is obvious that many modifications and variations of the present invention are possible in light of the above teachings. It is therefore to be understood that within the scope of the appended claims, the invention may be practiced otherwise than as described.

What is claimed is:

1. A method of fabricating a boom or cable based on a series of closely-spaced rigid rectangular blocks for flexible unwinding in a given direction from a winding on a compact reel mechanism to rigidly project out from a vehicle over a controlled large radius arc, the method comprising the steps of:
    configuring a cable based on a rectangular bar of stainless steel or plastic having thin slices or precision cuts almost completely through the bar such that a series of closely-spaced rigid rectangular blocks are formed, wherein the uncut portions interconnect the cut portions and hold the cable together;
    holding together said series of closely-spaced rigid rectangular blocks by connecting or interconnecting said blocks;
    configuring a sensor or an illuminator on an end of the cable; and
    provisioning flat conductors sandwiched between insulated layers on a top surface of the cable for the purpose of connecting power, video and/or data lines to said sensor or illuminator.

2. The method of fabricating a boom or cable according to claim 1, wherein said series of closely-spaced rigid rectangular blocks are held together by the uncut portions.

3. The method of fabricating a boom or cable according to claim 1, wherein said series of closely-spaced rigid rectangular blocks are interconnected by said uncut portions on the top.

4. The method of fabricating a boom or cable according to claim 1, wherein said series of closely-spaced rigid rectangular blocks are interconnected by a series of uncut portions connecting the blocks that face each other.

* * * * *